United States Patent
Lu et al.

(10) Patent No.: US 10,910,655 B2
(45) Date of Patent: Feb. 2, 2021

(54) METHOD OF MAKING CARBON NANOTUBES DOPED WITH IRON, NITROGEN AND SULPHUR

(71) Applicant: City University of Hong Kong, Kowloon (HK)

(72) Inventors: Jian Lu, Kowloon (HK); Yang Yang Li, Kowloon (HK); Shanshan Zeng, Kowloon (HK)

(73) Assignee: City University of Hong Kong, Kowloon (HK)

( * ) Notice: Subject to any disclaimer, the term of this patent is extended or adjusted under 35 U.S.C. 154(b) by 0 days.

(21) Appl. No.: 16/558,402

(22) Filed: Sep. 3, 2019

(65) Prior Publication Data

US 2020/0014038 A1    Jan. 9, 2020

Related U.S. Application Data

(62) Division of application No. 15/459,202, filed on Mar. 15, 2017, now Pat. No. 10,439,229.

(51) Int. Cl.
| | |
|---|---|
| *H01M 4/90* | (2006.01) |
| *H01M 4/96* | (2006.01) |
| *C01B 32/158* | (2017.01) |
| *C01B 32/168* | (2017.01) |
| *C01B 32/16* | (2017.01) |
| *C01B 32/164* | (2017.01) |
| *B01J 21/18* | (2006.01) |
| *B01J 35/00* | (2006.01) |
| *B01J 35/06* | (2006.01) |
| *H01M 12/06* | (2006.01) |

(52) U.S. Cl.
CPC ......... *H01M 4/9041* (2013.01); *B01J 21/185* (2013.01); *B01J 35/0013* (2013.01); *B01J 35/06* (2013.01); *C01B 32/158* (2017.08); *C01B 32/16* (2017.08); *C01B 32/164* (2017.08); *C01B 32/168* (2017.08); *H01M 4/96* (2013.01); *C01B 2202/22* (2013.01); *H01M 12/06* (2013.01)

(58) Field of Classification Search
None
See application file for complete search history.

(56) References Cited

U.S. PATENT DOCUMENTS

2014/0011671 A1*  1/2014  Guo ...................... B01J 35/006
                                                          502/159

OTHER PUBLICATIONS

Choi et al.; Adsorption of Polymer Coated Magnetite Composite Particles Onto Carbon Nanotubes and Their Magnetorheology; Materials Letters; 63, 861-863; 2009.*

(Continued)

*Primary Examiner* — Guinever S Gregorio
(74) *Attorney, Agent, or Firm* — Renner Kenner Greive Bobak Taylor & Weber

(57) ABSTRACT

A method of making carbon nanotubes doped with iron, nitrogen and sulphur for an oxygen reduction reaction catalyst includes the steps of mixing an iron containing oxidising agent with a sulphur-containing dye to form a fibrous fluctuate of reactive templates and using these for in-situ polymerisation of an azo compound to form polymer-dye nanotubes, adding an alkali to precipitate magnetite, and subjecting the nanotubes to pyrolysis, acid leaching, and heat treatment.

10 Claims, 10 Drawing Sheets

(56) References Cited

OTHER PUBLICATIONS

Ashraf et al.; Electrospun, Non-Woven, Nanofibrous Membranes Prepared from Nano-Diamond and Multi-Walled Carbon Nanotube-Filled Poly(Azo-Pyridine) and Epoxy Composites Reinforced with These Membranes; Journal of Plastic Film & Sheeting, vol. 30(04), 369-387; 2014.*

Ko et al.; Adsorption of polymer coated Magnetite Composite Particles Onto Carbon Nanotubes and Their Magnetorrheology; Materials Letters; vol. 63, Issue 11; Apr. 2009.*

* cited by examiner

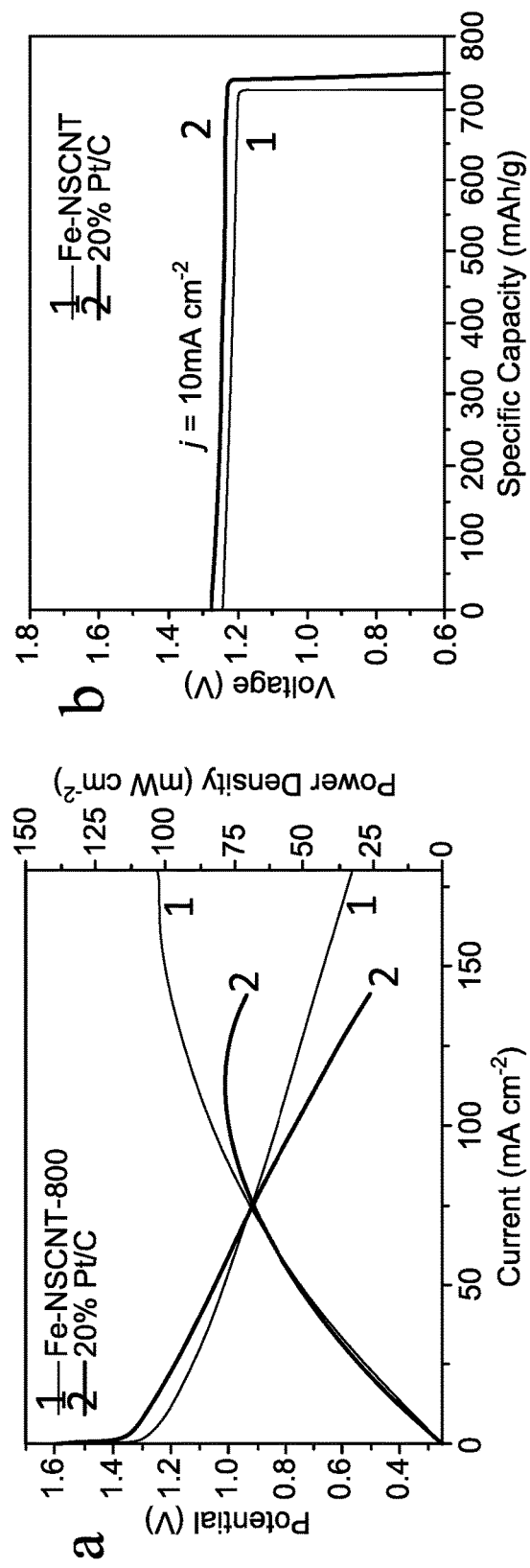
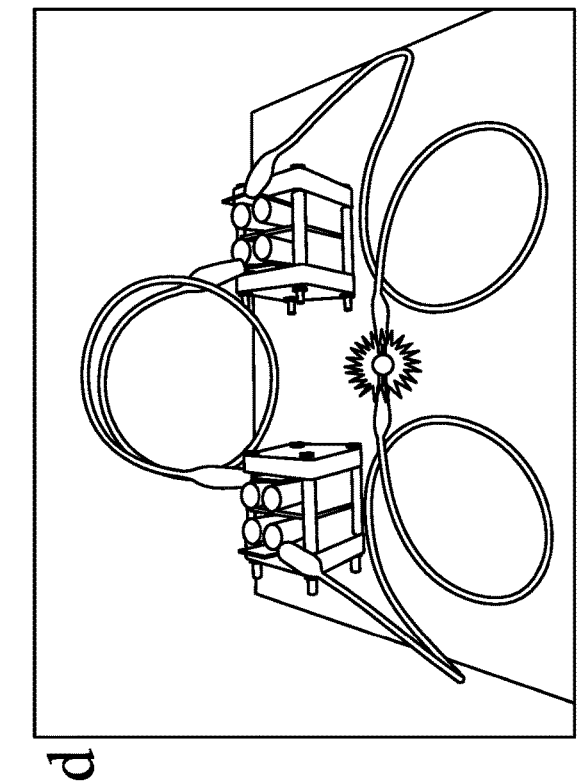
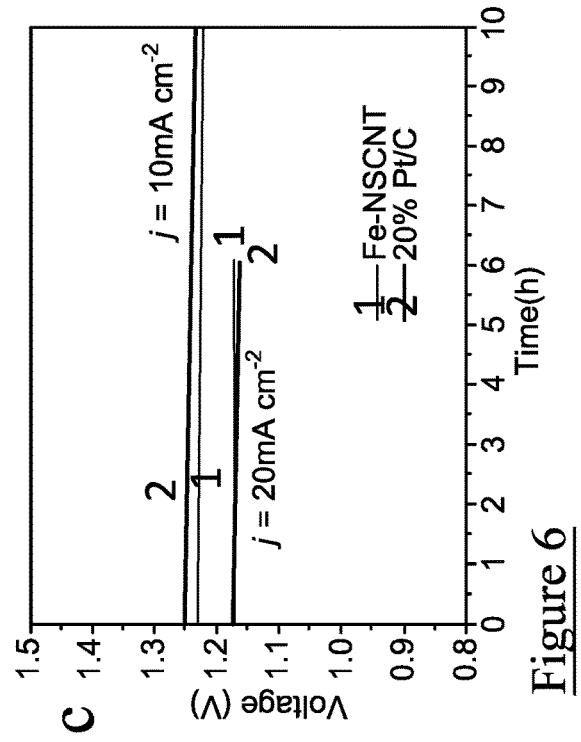
Figure 6

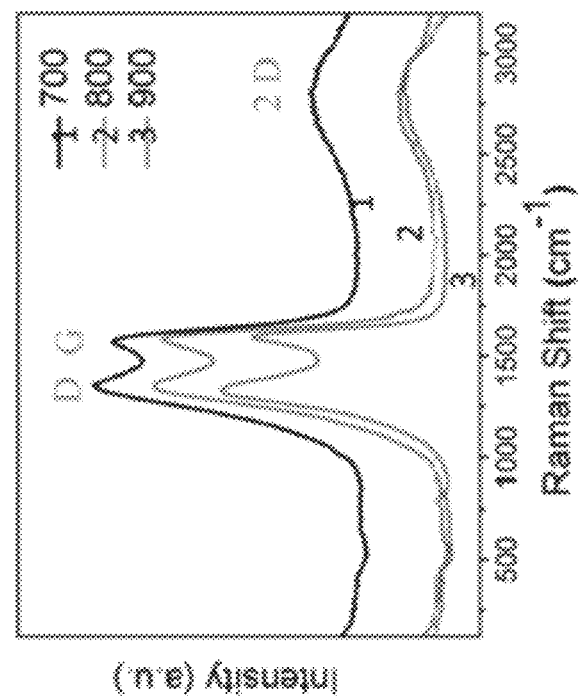
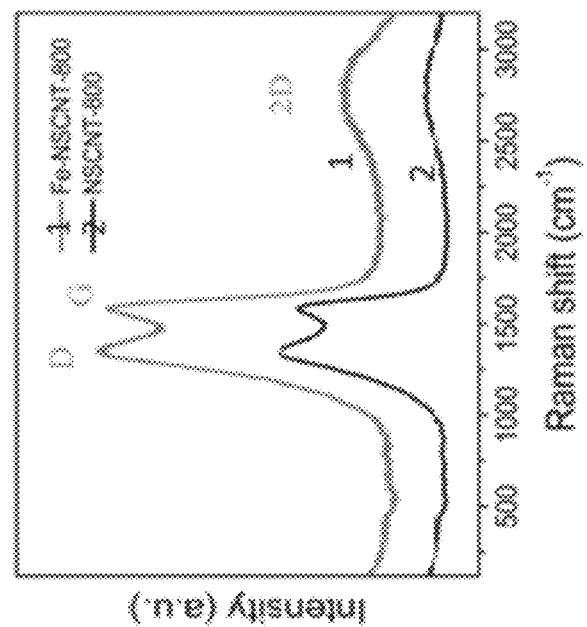
Figure 7

METHOD OF MAKING CARBON NANOTUBES DOPED WITH IRON, NITROGEN AND SULPHUR

FIELD OF INVENTION

The invention relates to a method of making carbon nanotubes doped with iron, nitrogen and sulphur.

BACKGROUND

A Polymer Electrolyte Membrane (PEM) fuel cell typically comprises electrodes, an electrolyte, a catalyst, and gas diffusion layers. A mixture of catalyst, carbon, and electrode is coated onto the solid electrolyte and carbon is hot pressed on either side to protect the inside of the cell and also act as electrodes. The cell reactions occur at the triple phase boundary (TPB) where the electrolyte, catalyst, and reactants mix.

The membrane conducts hydrogen ions but not electrons and it must also not allow gas from one side of the cell to pass to the other. Splitting of the hydrogen molecule is relatively easy by using a platinum catalyst.

Oxygen reduction reaction (ORR) catalysts play an essential role in large-scale implementation of PEM fuel cells and those on the market tend to use noble metals, such as platinum, iridium and ruthenium, due to their low overpotential and high current density. However, such catalysts suffer from problems like high cost, scarcity, aggregation in alkaline electrolytes, susceptibility to methanol, and carbon monoxide (CO) poisoning Transition metal-based and heteroatom-doped carbon materials are regarded as promising replacements for commercial catalysts in oxygen reduction reactions for PEM fuel cells and metal-air batteries.

However, in most cases researchers mainly focus on introducing foreign species on the surface or in the void space of carbon nanostructures, potentially leading to loose attachment and aggregation of the dopants, thus the synergetic effect between the dopant and carbon structure is compromised.

An aim of the invention therefore is to provide a material for an ORR catalyst which overcomes the above issues.

SUMMARY OF INVENTION

In an aspect of the invention, there is provided a method of making carbon nanotubes doped with iron, nitrogen and sulphur, comprising the steps of:
  mixing an iron containing oxidising agent with a sulphur-containing dye to form a fibrous fluctuate of reactive templates;
  adding an azo compound to the reactive templates for in-situ polymerisation to form polymer-dye nanotubes;
  adding an alkali to precipitate magnetite embedded in the walls of the nanotubes;
  subjecting the nanotubes to pyrolysis for initiating carbonisation of the azo polymer and for decomposing the sulphur-containing dye;
  subjecting the nanotubes to acid leaching for removing superfluous materials; and
  subjecting the nanotubes to heat treatment for further decomposing the sulphur-containing dye, activating iron species and further carbonising the azo polymer.

Advantageously the method is simple and scalable, and the resulting catalyst showed excellent ORR performance comparable to state-of-the-art platinum/carbon catalysts in alkaline media due to the synergistic effect between the iron and metalloid elements which is reinforced by the intimate contact between the iron-containing nanoparticles and the carbon walls doped with nitrogen and sulphur. It is also a promising candidate for the electrodes of supercapacitors, metal-air batteries and gas adsorbents, etc.

In one embodiment the reactive templates are self-degrade nanowire templates.

In one embodiment the iron containing oxidising agent is iron(iii) chloride ($FeCl_3$) or iron(iii) nitrate ($Fe(NO_3)_3$).

In one embodiment the iron containing oxidising agent and sulphur-containing dye are mixed in a ratio of around 3:1.

In one embodiment the sulphur-containing dye is methyl orange.

In one embodiment the azo compound is a pyrrole, aniline, carbazole, indole or the like. Typically the azo polymer is a polypyrrole, polyaniline, polycarbazole, polyindole, or the like.

In one embodiment, after the azo compound is added to the reactive templates, the mixture is stirred at room temperature for about 24 hours. The azo compound polymerises around the fibrous template through oxidation by the iron species in the template, driving the iron species to diffuse out from the inner fibrous core towards the polymer shells, leading to hollow nanotubes.

In one embodiment the nanotubes have a diameter ranging from around 20 to about 200 nanometres.

In one embodiment the alkali is sodium hydroxide or potassium hydroxide. Typically the alkali has a concentration of 0.5 M. Typically the nanotubes are in the form of a black fluffy powder.

In one embodiment the pyrolysis step comprises subjection to temperatures of around 400-600° C. for about two hours. This triggers the preliminary thermal carbonisation of the nanotubes and better anchors iron oxide particles in the nanotube wall. In one embodiment this step takes place in an atmosphere of inert gas, typically argon.

In one embodiment the carbon in the nanotubes is substantially derived from the carbonisation processes.

In one embodiment the azo polymer serves as the source of the nitrogen dopant.

In one embodiment the sulphur-containing dye serves as the source of the sulphur dopant.

In one embodiment the iron-containing oxidising agent serves as the source of the iron dopant.

In one embodiment the nitrogen and sulphur dopants are homogeneously distributed in the carbon nanotube.

In one embodiment the acid leaching step removes superfluous less-active oxide materials.

In one embodiment the heat treatment step comprises subjection to temperatures of around 700-900° C. for about 5 hours. In one embodiment this step takes place in an atmosphere of inert gas, typically argon.

In a further aspect of the invention there is provided a composition of carbon nanotubes doped with iron, nitrogen and sulphur made according to the method described herein.

In one embodiment the iron is in the form of magnetite crystals. In one embodiment the magnetite crystals are embedded in the wall of the nanotubes.

In a yet further aspect of the invention the composition is used as a functional material in an electrode, filter, absorber, catalyst, sensor, and/or the like. In one embodiment the composition is used as an oxygen reduction reaction catalyst.

BRIEF DESCRIPTION OF DRAWINGS

It will be convenient to further describe the present invention with respect to the accompanying drawings that illustrate possible arrangements of the invention. Other arrangements of the invention are possible, and consequently the particularity of the accompanying drawings is not to be understood as superseding the generality of the preceding description of the invention.

FIG. 1 illustrates the steps for making doped carbon nanotubes according to an embodiment of the invention.

FIG. 6 illustrates performance of a primary Zn-air battery (a) Polarization and power density curves of primary Zn-air batteries using Fe-NSCNT and 20% Pt/C (mass loading of 1 mg cm$^{-2}$) and 6 M KOH electrolyte (scan rate, 5 mVs$^{-1}$). (b) Specific capacities of the Zn-air batteries using Fe-NSCNT as ORR catalyst are normalized to the mass of the consumed Zn. (c) Discharge curves of the primary Zn-air batteries using Fe-NSCNT and 20% Pt/C as the ORR catalyst and the KOH electrolyte at 10 and 20 mA cm$^{-2}$. (d) Photograph of the two Zn-air batteries (using the Fe-NSCNT-800 cathode) connected in series lighting an LED bulb.

FIG. 7 illustrates Raman spectra of (a) Fe-NSCNT-800 and NSCNT-800 and (b) Fe-NSCNT-700, Fe-NSCNT-800 and Fe-NSCNT-900.

DETAILED DESCRIPTION

Figure 1:
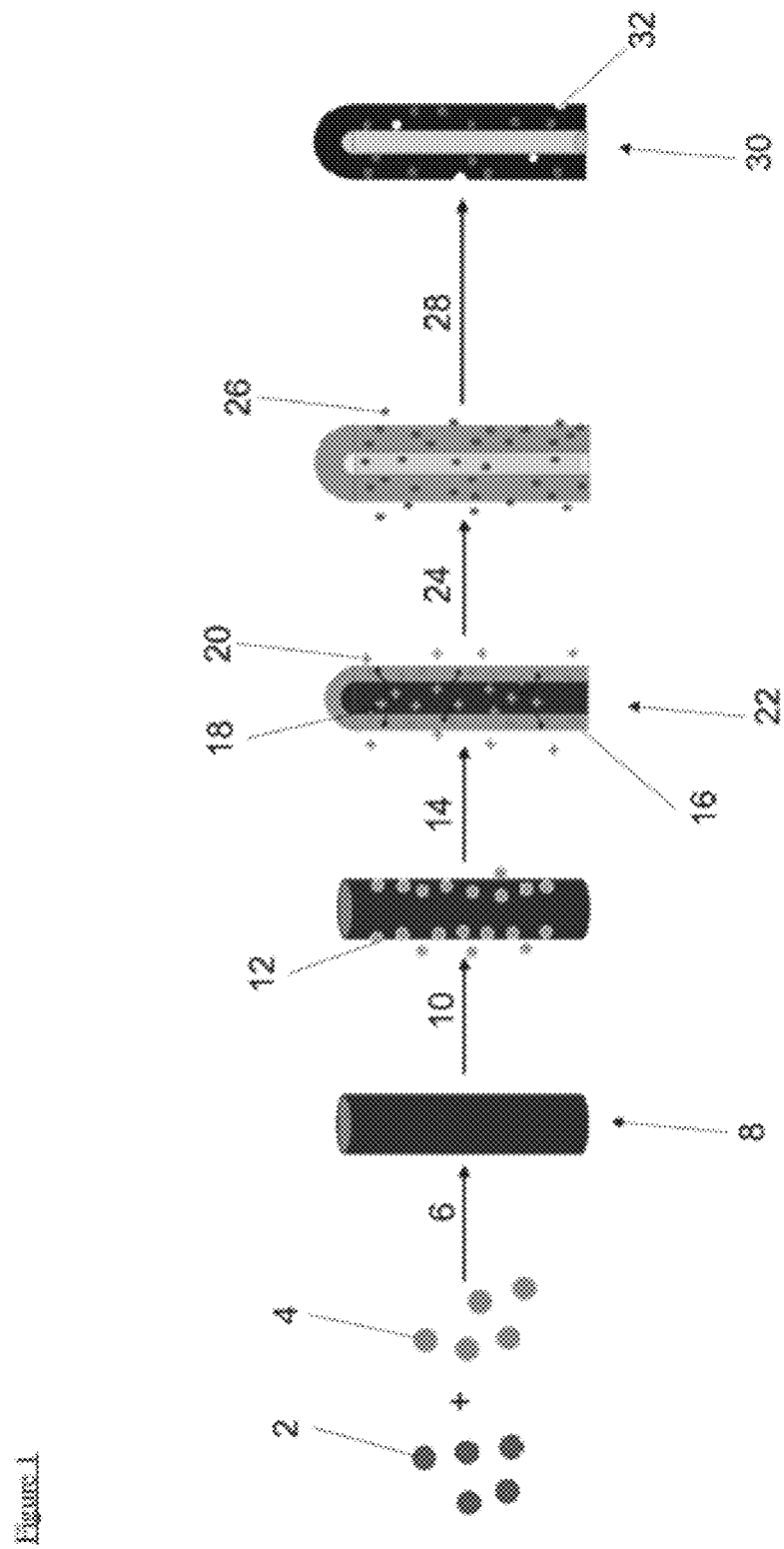

With regard to FIG. 1, the overall method of making carbon nanotubes doped with iron, nitrogen and sulphur is illustrated.

In the first step, 5 mmol methyl orange 2 was dissolved in 30 ml deionized water, and then mixed 6 with an iron containing oxidising agent such as 1.5 mmol iron(iii) chloride (FeCl$_3$) to form a fibrous fluctuate comprising reactive templates 8.

An azo compound such as 105 μl pyrrole 12 is then added 10 which reacts 14 in an in-situ polymerisation, coating the templates with polypyrrole 16. The iron(iii) (Fe$^{3+}$) ions 20 from the inner fibre migrate out to oxidize the pyrrole, leaving iron(ii) (Fe$^{2+}$) ions 18 inside, resulting in the formation polypyrrole-methyl orange nanotubes 22.

An alkali such as 50 ml 0.5 M sodium hydroxide (NaOH) is then added 24, which causes magnetite (Fe$_3$O$_4$) 26 to precipitate in the walls of the nanotubes. The precipitate was filtered, washed with deionized water/ethanol, and dried in vacuum at 60° C. for around 24 hours.

In the last step 28 the nanotubes are ground into fluffy powder, transferred into a lidded ceramic boat, and subjected to pyrolysis at around 500° C. for initiating carbonisation of the polypyrrole. The cooled sample in the form of black powder was then immersed in 6 M HCl solution for around 12 hours (acid leaching) to remove the superfluous iron materials, and then after washing and drying the powder was subjected to heat treatment in argon for around 5 hours at around 700-900° C. for decomposing the methyl orange, activating iron species and further carbonising the polypyrrole.

The resulting iron nitrogen sulphur tri-doped carbon nanotubes 30 (Fe-NSCNT) 30 offer the benefits of carbon nanotubes such as good electrical conductivity, high surface area and excellent mechanical property, with the doped heteroatoms enabling modified electronic and chemical characteristics, optimizing the catalytic performance. The Fe$_3$O$_4$ crystals are embedded in the walls of the carbon nanotubes thereby substantially reinforcing the synergetic effect with the carbon and increasing ORR performance.

The carbon nanotubes include nanopores 32 which increases surface area and the number of catalytic active sites.

Materials Characterizations

The morphology of the as-prepared samples were investigated using scanning electron microscopy (SEM, Philips XL-30 FESEM), and transmission electron microscopy (TEM, JEOL TEM 2100F FEG operated with an accelerating voltage of 200 kV). Raman spectrum was conducted with a Renishaw-200 visual Raman microscope (633 nm in wavelength). The X-ray diffraction (XRD) patterns were collected using an X-ray diffractometer (Rigaku SmartLab) using Cu Kα radiation. Brunauer-Emmett-Teller (BET) surface area and total pore volume were tested on a Micromeritics, ASAP2020 gas sorption analyzer at 77K. X-ray photoelectron spectroscopy (XPS) measurements were carried out on a VG ESCALAB 220i-XL surface analysis system.

Electrochemical Measurements 4 mg catalyst was dispersed in 400 μL of 0.5 wt % Nafion solution ultrasonically to form homogeneous slurry. The slurry (8 μL) was then transferred onto a glassy carbon electrode with a catalyst loading of 409 μg cm$^{-2}$. The catalyst-coated glassy carbon electrode (GCE, 0.19625 cm$^2$), Hg/HgO (KOH, 0.1 M), and Pt wire were used as the working, reference and counter electrode, respectively. Electrochemical measurements were conducted on a Biologic VMP3 electrochemical station with a three-electrode cell system at room temperature. For comparison, Pt/C powder was purchased from Alfa Aesar and tested.

All the electrochemical experiments were performed in $O_2$- or Ar-saturated 0.1 M KOH (0.5 M $H_2SO_4$) electrolyte.

Cyclic voltammograms (CVs) were performed between −0.8 and +0.2 V versus Hg/HgO in 0.1 M KOH (or between −0.4 and 0.7 V versus SCE in 0.5 M $H_2SO_4$), at a scan rate of 10 mV s$^{-1}$. The rotating disk electrode (RDE) was investigated at different rotating speed from 400 to 2500 rpm, and the rotating ring-disc electrode (RRDE) at 1600 rpm. The electron transfer number (n) was determined from the following equations (eq. 1):

$$n = 4 \times \frac{I_d}{I_d + I_r/N} \quad (1)$$

where N=0.37 is the collection efficiency, $I_d$ and $I_r$ are the disk and ring current, respectively.

The current density ($J_K$) of the samples was analyzed by RDE and calculated on the basis of the Koutecky-Levich equations (eqs. 2-4):

$$\frac{1}{J} = \frac{1}{J_L} + \frac{1}{J_K} = \frac{1}{B\omega^{1/2}} + \frac{1}{J_K} \quad (2)$$

$$B = 0.62nFC_0(D_0)^{2/3}c^{-1/6} \quad (3)$$

$$J_K = nFkC_0 \quad (4)$$

where J, $J_K$, $J_L$ are the measured current density, kinetic and diffusion limiting current densities, respectively, ω is the angular velocity of the disk, B is the reciprocal of the slope, which can be determined from the slope of K-L plot using Levich equation, n is the electron transferring number, F is the Faraday constant (96485 C mol$^{-1}$), $C_0$ is the bulk concentration of $O_2$, $D_0$ is the diffusion coefficient of $O_2$, ν is the viscosity of the electrolyte, and k is the electron transfer rate constant.

Zinc-Air Battery Tests

The measurements of the zinc-air batteries were performed using home-built electrochemical cells. The catalyst-coated carbon paper was used as the air cathode (catalyst mass loading of 1 mg cm$^{-2}$), while a Zn foil (2.5 cm*2 cm*0.3 mm) was employed as the anode. The zinc-air battery was fabricated by pairing the cathode and anode in 28 ml of 6 M KOH. Linear sweep voltammetry (LSV) was conducted within a range of 1.6 V-0.4 V at 5 mV s$^{-1}$ using a potentiostat (CHI 660E). A battery cycler (Neware) was used to measure the galvanostatic discharge curves.

Figure 2:
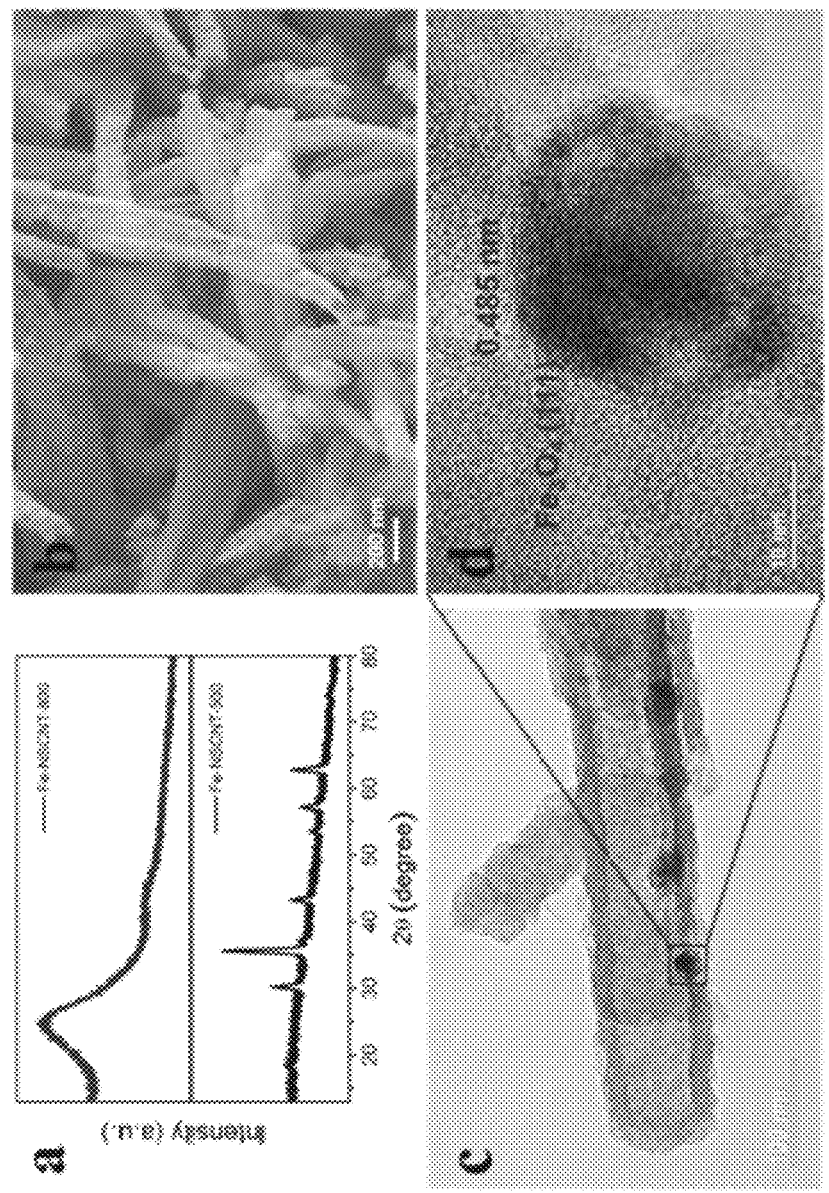
FIG. 2 illustrates (a) XRD spectrum of Fe-NSCNT-500 and Fe-NSCNT-800, (b) SEM image, (c) low magnification and (d) high magnification TEM images of Fe-NSCNT-800.

FIG. 2 illustrates that the acid treatment removes most of the superficial $Fe_3O_4$ precipitate and leaves behind only the highly catalytically active $Fe_3O_4$ nanoparticles that are enchased in the walls of N/S-doped carbon nanotubes.

In more detail, the XRD patterns (FIG. 2a) of Fe-NSCNT-precursor showed diffraction peaks at 30.48°, 35.52°, 43.32°, 53.36°, 57.01°, 62.73° and 74.35° which are assigned to the (220), (311), (400), (422), (511) and (440) of $Fe_3O_4$ (ICDD No. 27-1402), respectively. However, no diffraction features of $Fe_3O_4$ were observed for Fe-NSCNT-800 (FIG. 2b), confirming the removal of most iron species upon acid leaching. Notably, two broad peaks located at 24.8 and 42.8° were observed in Fe-NSCNT-800 and NSCNT-800, corresponding to the (002) planes of graphitic carbon and the (100) planes of a hexagonal carbon material (JCPDS No. 75-1621), respectively, indicating the presence of graphitic carbon in Fe-NSCNT-800 and NSCNT-800. Furthermore, Raman spectrum (FIG. 7) shows that the Fe-NSCNT has higher degree of graphitic ordering than N, S-CNT ($I_D/I_G$=0.9 and lower 2D peak) and thus higher conductivity, beneficial for the oxygen reduction process.

SEM and TEM studies (FIG. 2b-d) clearly shows the nanotubular morphology of Fe-NSCNT-800. Dissociative particles were spotted in the nanotube walls of the Fe-NSCNT-precursor, rather than Fe-NSCNT-800 (FIG. 2c), indicating that the acid treatment washes away almost all the $Fe_3O_4$ particles that were loosely attached onto the NSCNT wall, which is in good agreement with the XRD results discussed above. Further TEM observation reveals that the Fe-containing nanoparticles were embedded in the tube walls for Fe-NSCNT-800 (FIG. 2c). The lattice spacing of the particles was measured 0.485 nm from the high resolution TEM images (FIG. 2d), corresponding to the (111) planes of $Fe_3O_4$. As will be shown in a later part of this article, the great synergistic effect between the $Fe_3O_4$ and the N, S-doped carbon tubes attributes to the superior ORR performance of Fe-NSCNT-800. For comparison, no nanoparticles were found in the wall of NSCNT-800.

Figure 3:
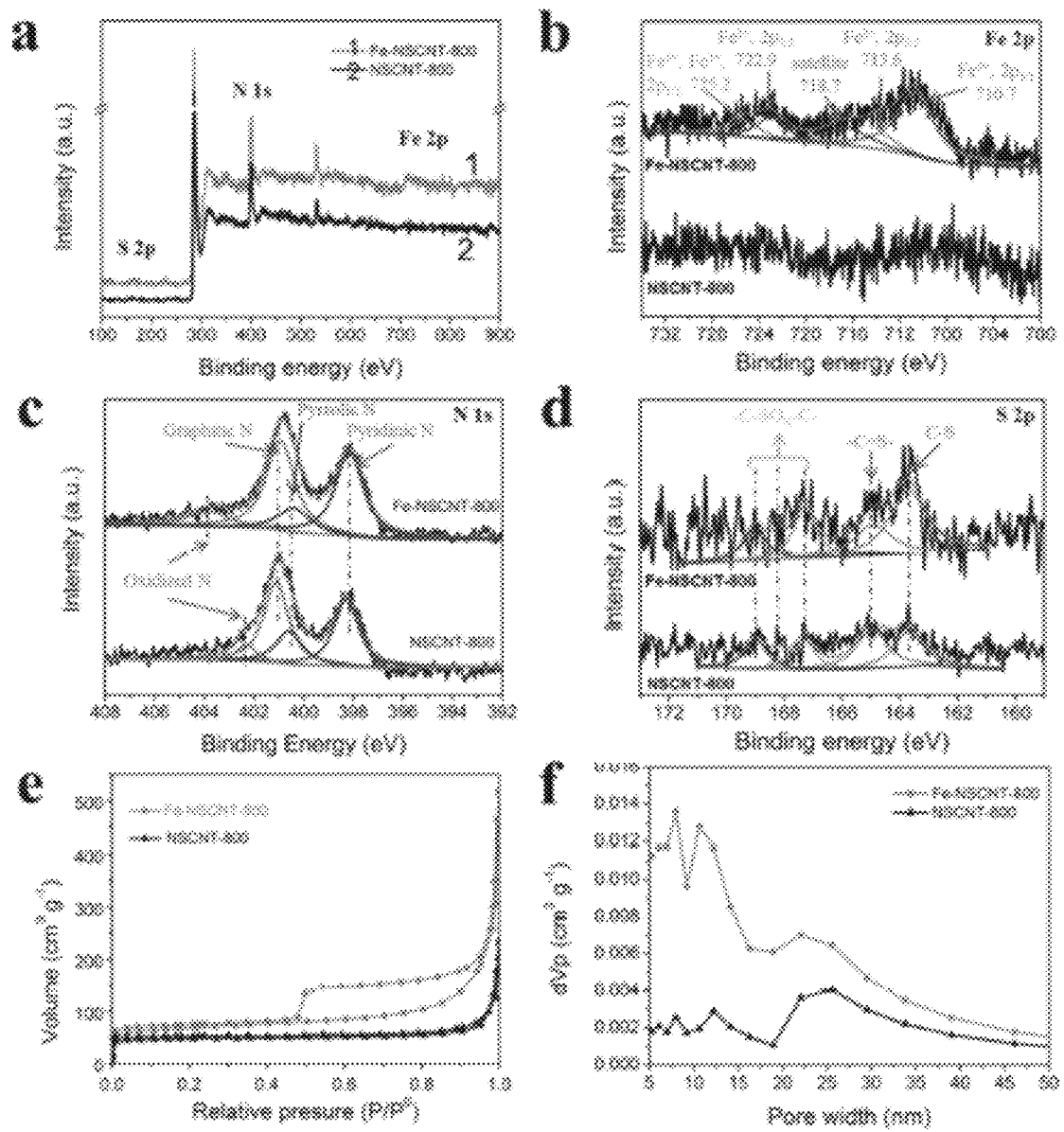
FIG. 3 illustrates (a) Survey scan of XPS spectrum of Fe-NSCNT and NSCNT. (b) N1s, (c) S2p, (d) Fe 2p, (e) $N_2$ adsorption isotherms of Fe-NSCNT-800 and NSCNT-800, (f) BJH method size distribution.

FIG. 3 confirms that the successful incorporation of the Fe species in N/S-doped carbon nanotubes (Fe-NSCNT-800), and the high surface area and hierarchical mesoporous morphology of Fe-NSCNT-800.

In more detail, X-ray photoelectron spectroscopy (XPS) measurements (FIG. 3a) revealed the presence of C, N, S, O and Fe in Fe-NSCNT-800, whereas no Fe was detected in NSCNT-800. The high-resolution Fe 2p spectra (FIG. 3b) further confirmed that no Fe 2p signal was detected for NSCNT-800, while Fe-NSCNT-800 exhibited clear Fe 2p peaks that can be deconvoluted into five peaks at 710.7, 713.6, 718.7, 722.9, and 725.2 eV. The peaks at 710.7 and 713.6 eV can be assigned to 2p3/2 of Fe (III) and Fe (II) ions, respectively. The peak at 722.9 eV can be assigned to 2p1/2 of Fe(II) ion, and the peak at 725.2 eV to 2p1/2 of Fe(II) and Fe(III) ions. The peak at 718.7 eV was a satellite peak for the above four peaks, indicating the co-existence of Fe(II) and Fe(III) at a mole ratio (II:III) of ~1.8. It can be concluded from the XPS results that Fe in Fe-NSCNT-800 was mainly present in the form of $Fe_3O_4$.

Fittings of the N is spectra of Fe-NSCNT-800 and NSCNT-800 (FIG. 3c) both showed 4 peaks assigned to pyridinic N (~398.7 eV), pyrrolic N (~400.4 eV), graphitic N (~401.2 eV), and oxidized N (403.8 eV and 402.4 eV). The peaks at 398.7 eV for Fe-NSCNT-800 possibly contribution from the bonding between N and Fe (N—Fe), considering the binding energy of pyridinic N is almost same as N—Fe. It should be pointed out that all of these observed N species, except the uncertain contribution of the oxidized N, have been reported to play a crucial role in the ORR process. The high-resolution S 2p spectrum (FIG. 3d) detected S 2p1/2 and 2p3/2 doublet at 164.9 eV and 163.7 eV spin-orbit levels with an energy separation of 1.2 eV and an intensity ratio of 1:2, due to the formation of C=S and C—S bonds, respectively, confirming the S doping of the carbon nanotubes. The peaks at 166-172 eV corresponding to —C—$SO_x$—C— possibly originated from the MO species. These types of S dopants are reported to improve the ORR activity.

The $N_2$-adsorption/desorption isotherm (FIG. 3e) of Fe-NSCNT-800 displayed type-IV characteristics with sharp uptakes at low relative pressure (<0.05) and H3-type hysteresis loops (uptakes for relative pressure ranging from 0.45 to 1.0), indicating its mesoporous structure. The pore-size distribution of Fe-NSCNT-800 (mainly centered at 7-8.5 nm, 10-13 nm and 19-29 nm, FIG. 3f) indicated its hierarchical mesoporous structure of, while much less mesopores, particularly for pores below 20 nm, were detected in NSCNT-800 (FIG. 3f). Moreover, the specific surface area of Fe-NSCNT-800 (247.21 m$^2$ g$^{-1}$) is significantly larger than that of NSCNT-800 (185.65 m$^2$g$^{-1}$), due to the different post-treatment of Fe-NSCNT-800 which created more pores ranging in 7-13 nm. The increased surface area and hierarchical pore structure of Fe-NSCNT-800 are favorable for producing more active sites and rapid mass transfer for ORR.

Figure 4:
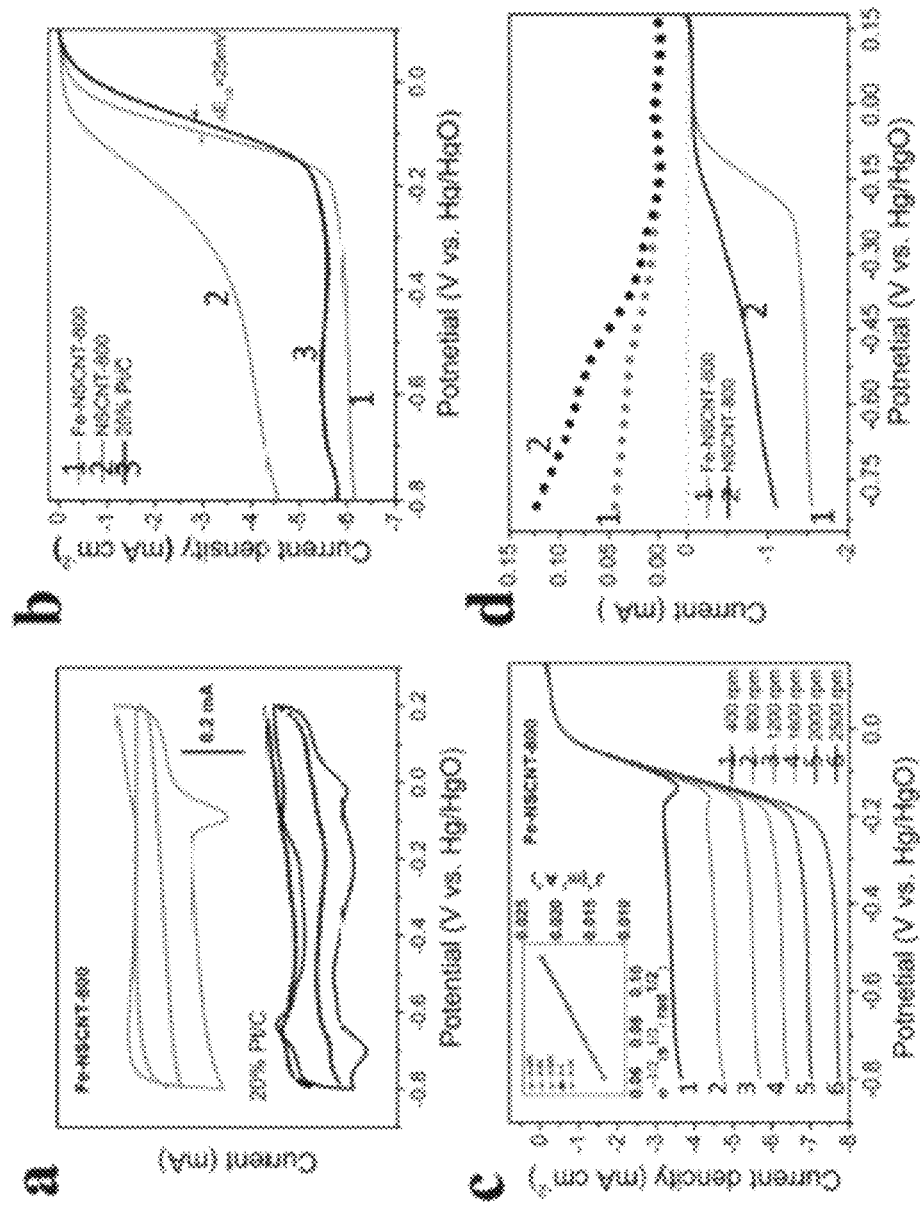
FIG. 4 illustrates (a) CV curves of Fe-NSCNT-800 and commercial 20% Pt/C catalyst in Ar-saturated (dotted line) and $O_2$-saturated (solid line) solution, respectively, (b) Linear sweep voltammetry (LSV) curves of Fe-NSCNT-800, NSCNT-800 and 20% Pt/C catalysts in $O_2$-saturated 0.1 M KOH solution at a sweep rate of 10 mV s$^{-1}$ and the electrode rotation speed of 1600 rpm, (c) LSV curves for Fe-NSCNT-800 at various rotation rates, inset show corresponding Koutecky-Levich plots at different potentials, (d) Rotating ring-disk electrode voltammograms recorded in $O_2$-saturated 0.1 M KOH at 1,600 rpm. Disk current ($I_d$) (solid line) is showed on the lower half and the ring current ($I_r$) (dotted line) is showed on the upper half of the graph.

FIG. 4 reveals that Fe-NSCNT-800 has comparable or enhanced ORR performances than both commercial 20% Pt/C and the control samples that are without Fe-doping (NS CNT-800).

In more detail, The ORR catalytic activity of Fe-NSCNT-800 and the commercial state-of-art 20% Pt/C catalyst were first investigated using cyclic voltammetry (CV) in O$_2$- or Ar-saturated alkaline solution (0.1 M KOH) (FIG. 4a). Featureless slopes were observed for Fe-NSCNT-800 in the Ar-saturated electrolyte. In sharp contrast, an obvious cathodic peak at −0.09 V (vs. Hg/HgO) appeared for Fe-NSCNT-800 in the O$_2$-saturated solution, which is much more prominent than the Pt/C catalyst, implying a superior ORR activity of Fe-NSCNT-800. The ORR performances of Fe-NSCNT-800 were further tested by both rotating disk electrodes (RDE) and rotation ring disk electrodes (RRDE). As shown in FIG. 4b, the Fe-NSCNT-800 catalyst exhibited extraordinary ORR performance with a half-wave potential of −0.088 V, comparable to that of commercial Pt/C catalyst (difference of only 25 mV). Impressively, the diffusion-limited current density of Fe-NSCNT-800 (6.1 mA cm$^{-2}$) is 1.5 times that of NSCNT-800 and significantly higher than the commercial Pt black (5.8 mA cm$^{-2}$). It was found that the ORR activity strongly depended on the heat treatment temperature of the Fe-NSCNT samples with the optimum temperature determined to be 800° C.: Fe-NSCNT-800 possessed the best onset potential ($E_{onset}$) and diffusion-limited current density, compared with Fe-NSCNT-700 and Fe-NSCNT-900. The RDE measurements at various rotating speeds at a scan rate of 10 mV s$^{-1}$ in O$_2$-saturated solution are carried out for Fe-NSCNT-800 (FIG. 4c) and NSCNT-800. For both samples, the current density displays a typical increase with rotation rate due to the thinned diffusion layer.

Calculated using the Koutecky-Levich equations, the electron transfer number (n) is only 3.24 for NSCNT-800 over the potential range from −0.6--0.45 V versus Hg/HgO. In sharp contrast, n=4.03 for the Fe-NSCNT-800 electrode over the same potential range (FIG. 8), indicating that it undergoes a four-electron reduction process in aqueous alkaline medium, similar to the Pt/C catalyst. The superior catalytic performance of Fe-NSCNT-800 is ascribed to the reinforced synergetic interaction between the enchased active Fe$_3$O$_4$ nanocrystals and the highly conductive NSCNT backbone. FIG. 4d showed the RRDE polarization curves for Fe-NSCNT-800 and NSCNT-800 loaded on a glassy carbon electrode in O$_2$-saturated 0.1 M KOH at 1,600 rpm, the corresponding ring current for the oxidation of hydrogen peroxide ions (HO$_2^-$) was measured at −0.3 V versus Hg/HgO. The ring current of NSCNT-800 was over two times larger than Fe-NSCNT-800 in the range of −0.25 to −0.8 V versus Hg/HgO, indicating that Fe-NSCNT-800 is more resistant to side reaction.

Figure 5:
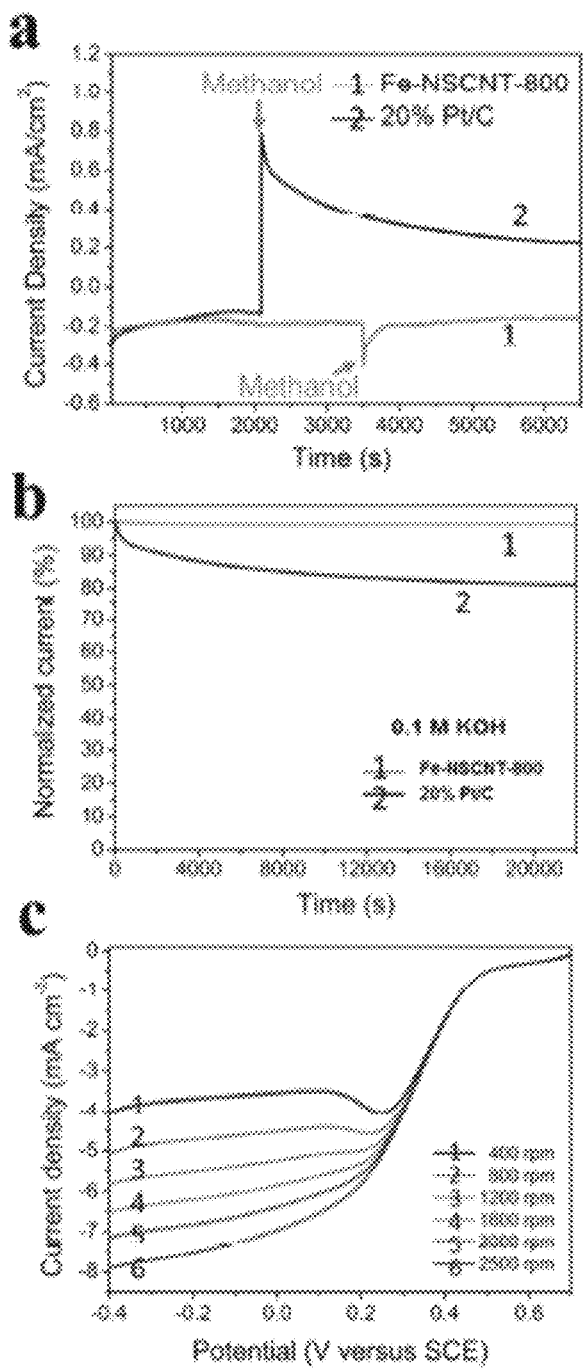
FIG. 5 illustrates (a) Current-time (I-t) curves for Fe-NSCNT-800 and the 20% Pt/C catalyst in $O_2$-saturated KOH (0.1 M) solution with the addition of methanol (final concentration of 3 M). (b) I-t curves for Fe-NSCNT-800 and the 20% Pt/C catalyst in $O_2$-saturated KOH (0.1 M) solution at −0.3 V versus Hg/HgO. (c) LSV curves for Fe-NSCNT-800 at various rotation rates in 0.5 M $H_2SO_4$.

FIG. 5 shows that Fe-NSCNT-800 has superior methanol tolerance and long-term stability, outperforming commercial 20% Pt/C.

Figure 9:
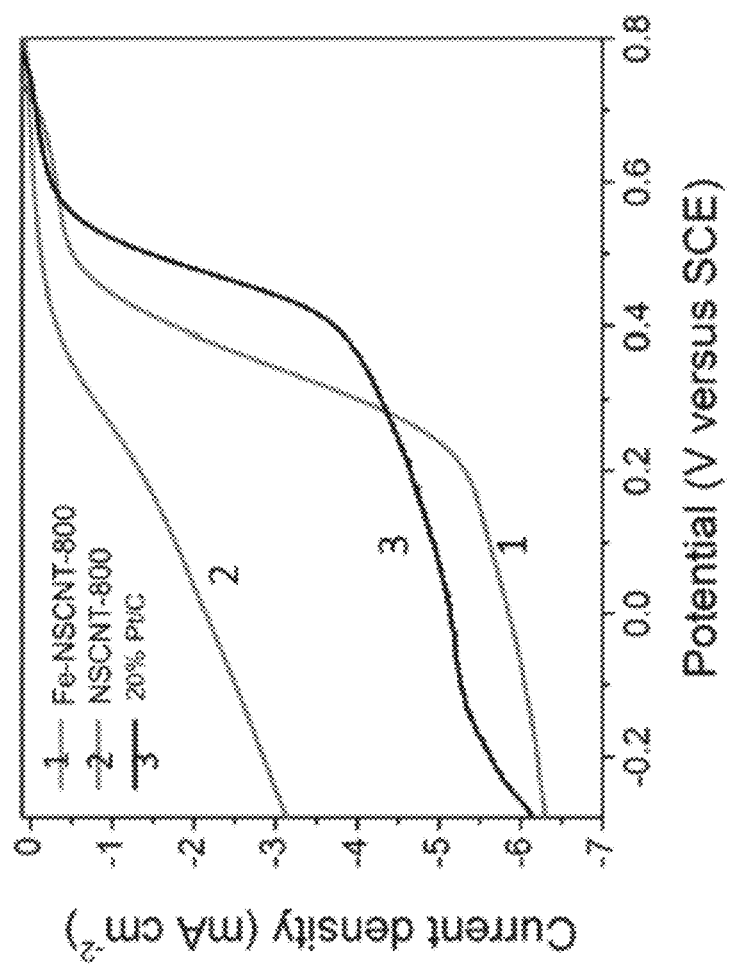
FIG. 9 illustrates LSV curves of Fe-NSCNT-800, NSCNT-800 and 20% Pt/C in the $O_2$-saturated $H_2SO_4$ (0.05 M) solution measured at a sweep rate of 10 mV s$^{-1}$ and an electrode rotation speed of 1600 rpm.

In more detail, the possible crossover effect caused by small organic molecules such as methanol is also tested by chronoamperometric (CA) (FIG. 5a). When methanol is added into the O$_2$-saturated 0.1 M KOH electrolyte (final concentration of 3 M), Fe-NSCNT-800 quickly recovers to the original current level, with no obvious decay observed. By contrast, for the Pt/C catalyst, addition of methanol triggers a drastic sharp surge of current density far more difficult for recovery to the initial level, indicating its much weaker tolerance against chemical corrosion than Fe-NSCNT-800. The CA measurements at −0.3 V versus Hg/HgO for Fe-NSCNT-800 (FIG. 5b) showed no significant decay after 6 h, whereas the current of Pt/C gradually dropped by ~19% within the same time frame, revealing the superior catalytic stability of Fe-NSCNT-800. Furthermore, Fe-NSCNT-800 showed high ORR activity in acidic solution. The RDE measurements were carried out in 0.5 M H$_2$SO$_4$ solution over the range of −0.4-0.7 V versus SCE. The catalytic activity order of the catalysts in acidic medium was the same as that in alkaline medium (FIG. 9). The onset potential of Fe-NSCNT-800 was determined to be 0.48V versus SCE. Moreover, the limiting current density of Fe-NSCNT-800 (5.6 mA cm$^{-2}$, FIG. 5c) at 1600 rpm was comparable to that in the alkaline solution FIG. 6 proves that when applied in Zn-air batteries, Fe-NSCNT-800 displays extraordinary performance, very close to the commercial 20% Pt/C, indicating its great potential in replacing Pt/C for the practical applications of noble metal-free zinc-air batteries.

In more detail a primary Zn-air battery was assembled with Fe-NSCNT-800 as the air cathode materials to further investigate its performance of under real battery operation conditions. A high open-circuit potential (OCP) (~1.41 V, FIG. 10) was observed for the fabricated Zn-air battery. Furthermore, the polarization and power density curves of the Fe-NSCNT-800-based Zn-air battery (FIG. 5a) revealed a current density of ~160 mA cm$^{-2}$ and a peak power density of ~100 mW cm$^{-2}$, comparable to the Pt/C catalyst (~110 mA cm$^{-2}$ and 75 mW cm$^{-2}$). When normalized to the mass of Zn consumed, the specific capacity of Fe-NSCNT-800-based battery was ~720 mAh gZn$^{-1}$ at 10 mA cm$^{-2}$, very close to those with 20% Pt/C (~735 Wh kgZn$^{-1}$ at 10 mA cm$^{-2}$) (FIG. 6b). Notably, the potential of the Fe-NSCNT-800-based battery (~1.23 V) is slightly lower than 20% Pt/C (~1.25 V) at 10 mA cm$^{-2}$, but became the same as 20% Pt/C (1.17V) at the higher current density of 20 mA cm$^{-2}$ (FIG. 6c). Furthermore, no significant potential drop was observed for the Fe-NSCNT-800-based battery under galvanostatic discharge for 10 h at 10 mA cm$^{-2}$ and for 6 h at 20 mA cm$^{-2}$ (FIG. 6c), indicating its good catalytic stability for ORR. To meet the specific energy and/or power needs for practical applications, multiple Zn-air batteries can be integrated into series circuits. As exemplified in FIG. 6d, two Zn-air batteries were connected in series to generate a sufficiently high OCP of ~3V to power a light-emitting diode (LED). The excellent performances of our Fe-NSCNT catalyst is ascribed to the reinforced synergetic interaction between the enchased Fe$_3$O$_4$ nanocrystals and the highly conductive NSCNT backbone, and its mesoporous morphology which facilitates the O$_2$ and electrolyte diffusion to the electroactive sites. From the above-discussed performance comparison between Fe-NSCNT-800 and 20% Pt/C, it can be clearly seen that Fe-NSCNT-800 holds great potential as an alternative of Pt/C for realizing noble-metal free Zn-air batteries.

FIG. 7 shows that Fe-NSCNT-800 possesses a higher degree of graphitic order, and thus higher conductivity, than Fe-NSCNT-7, Fe-NSCNT-900 and NSCNT-800, beneficial for ORR.

More specifically it can be seen that the Raman spectrum of all samples feature two broad bands. The D band peak centered at 1341 cm$^{-1}$ is strongly associated with the defective graphitic band, and the peak at 1590 cm$^{-1}$ (G band) corresponds to the crystalline graphite band. The integral intensity ratio ($I_G/I_D$) of the G and D bands is considered as an gauge for the graphitic ordering degree in carbon. The $I_G/I_D$ increases with the increase of pyrolysis temperature and reaches a maximum value of 0.95 at a temperature of 800° C., indicating the higher graphitic crystallinity of the carbon structures for Fe-NSCNT-800. Different from the common observation in literature that the carbon structure becomes more ordered with increased pyrolysis temperature, $I_D/I_G$ of Fe-NSCNT-900 decreases to 0.86, possibly because more heteroatoms are incorporated into the carbon structures when annealed at 900° C. lowering the structural orders. Moreover, compared with NSCNT-800 ($I_D/I_G$=0.9 and lower 2D peak), Fe-NSCNT-800 possesses a higher degree of graphitic ordering and thus higher conductivity, beneficial for ORR.

Figure 8:
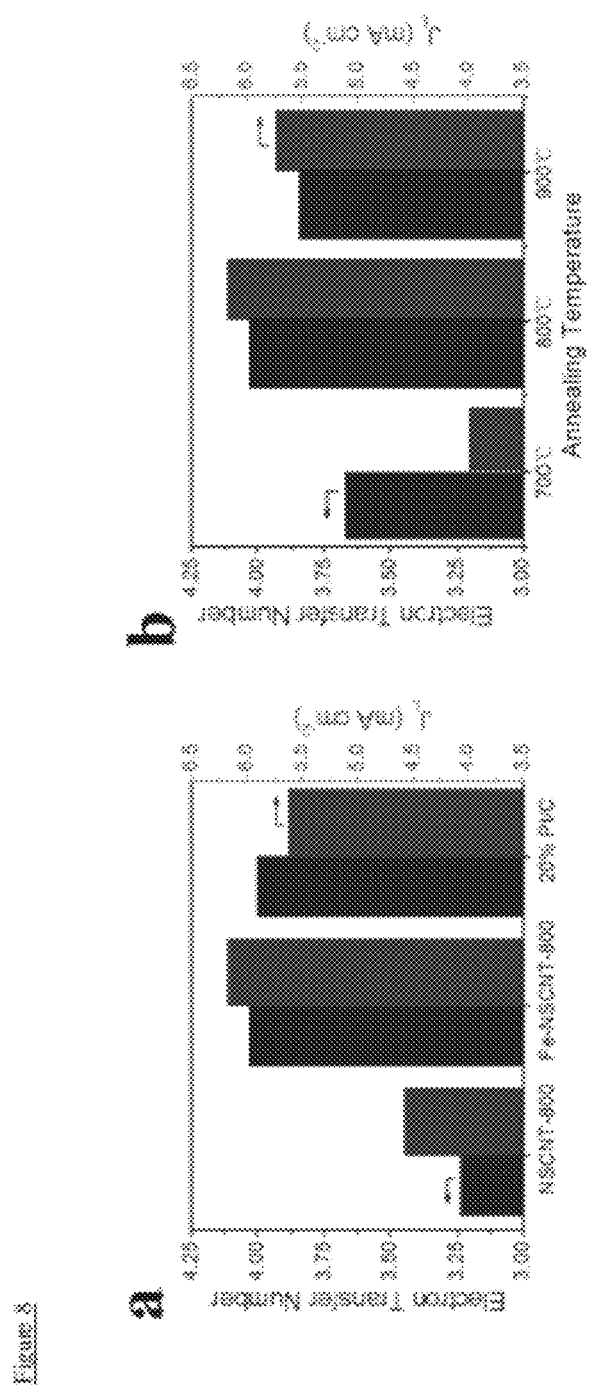
FIG. 8 illustrates a comparison of electron transfer number and diffusion limiting current density among (a) NSCNT-800, Fe-NSCNT-800 and 20% Pt/C, and (b) the Fe-NSCNT catalysts fabricated with different temperature used at the last annealing step.

FIG. 8 shows that Fe-NSCNT-800 has superior ORR performance with higher limiting current density than 20% Pt/C. Fe-NSCNT-800 outperforms Fe-NSCNT-700 and Fe-NSCNT-900 with enhanced limiting current density.

FIG. 9 proves the Fe-NSCNT-800 ORR catalyst can be used in the acid environment.

Figure 10:
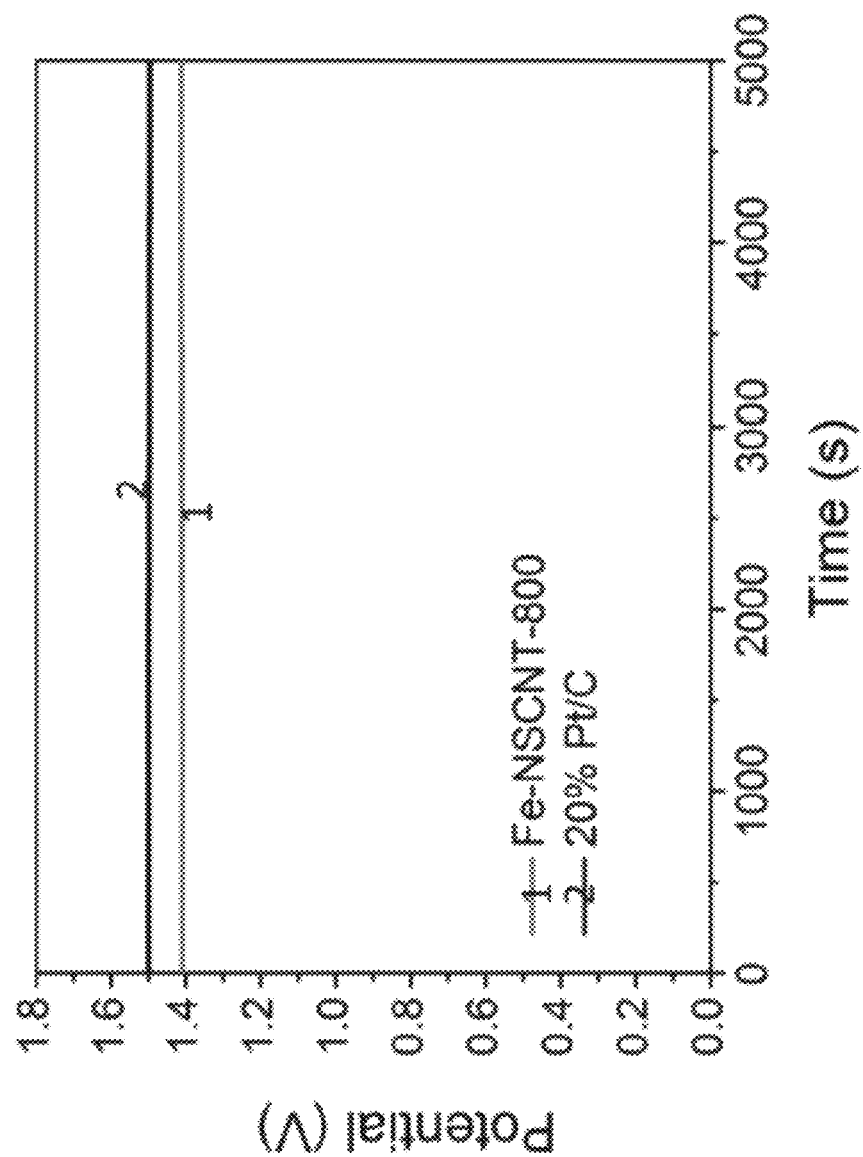
FIG. 10 illustrates OCV of Zn-air batteries constructed using Fe-NSCNT-800 and 20% Pt/C

FIG. 10 shows that Fe-NSCNT-800 has comparable Open Circuit Voltage to commercial 20% Pt/C.

It will be appreciated by persons skilled in the art that numerous variations and/or modifications may be made to the present invention as shown in the specific embodiments without departing from the spirit or scope of the invention as broadly described. The present embodiments are, therefore, to be considered in all respects as illustrative and not restrictive.

It will also be appreciated by persons skilled in the art that the present invention may also include further additional modifications made to the method which does not affect the overall functioning of the method.

Any reference to prior art contained herein is not to be taken as an admission that the information is common general knowledge, unless otherwise indicated. It is to be understood that, if any prior art information is referred to herein, such reference does not constitute an admission that the information forms a part of the common general knowledge in the art, any other country.

The invention claimed is:

1. A composition of carbon nanotubes, comprising:
 a plurality of carbonized polymer nanotubes, wherein a wall of the carbon nanotubes is defined with a plurality of nanopores; and
 a plurality of dopants including iron, nitrogen and sulphur embedding in the walls of the carbon nanotubes; wherein the iron is in the form of magnetite crystals.

2. The composition according to claim 1, wherein the polymer is an azo polymer.

3. The composition according to claim 1, wherein the magnetite crystals anchor to the carbon nanotubes.

4. The composition according to claim 3, wherein the magnetite crystals are embedded in the wall of the carbon nanotubes.

5. The composition according to claim 1, wherein the magnetite crystals include iron oxide.

6. The composition according to claim 5, wherein the magnetite crystals include $Fe_3O_4$.

7. An electrode, filter, absorber, catalyst, and/or sensor comprising the composition of claim 1.

8. An oxygen reduction reaction catalyst comprising the composition of claim 1.

9. The doped carbon nanotubes of claim 8, wherein the doped carbon nanotubes are used in an electrode of an electrical energy storage device.

10. The doped carbon nanotubes according to claim 9, wherein the electrical energy storage device further includes a polymer-electrolyte-membrane fuel cell, a metal-air battery or supercapacitor.

* * * * *